United States Patent [19]

Takagi et al.

[11] Patent Number: 5,408,082
[45] Date of Patent: Apr. 18, 1995

[54] IC CARD WITH HIERARCHICAL FILE STRUCTURE

[75] Inventors: Nobuya Takagi, Neyagawa; Yoshihiro Mutoh, Ibaraki; Masaaki Ueda, Katano; Nobunari Murai; Takeshi Nakatomi, both of Osaka, all of Japan

[73] Assignee: Matsushita Electric Industrial Co., Ltd., Osaka, Japan

[21] Appl. No.: 105,646

[22] Filed: Aug. 12, 1993

[30] Foreign Application Priority Data

Aug. 13, 1992 [JP] Japan .................................. 4-215817
Oct. 19, 1992 [JP] Japan .................................. 4-279884

[51] Int. Cl.$^6$ ......................................... G06K 19/06
[52] U.S. Cl. ....................... 235/492; 235/380; 235/441; 235/382
[58] Field of Search ............... 235/380, 492, 441, 382, 235/375

[56] References Cited

U.S. PATENT DOCUMENTS

| | | | |
|---|---|---|---|
| 4,849,614 | 7/1989 | Watanabe et al. | 235/382 X |
| 4,882,474 | 11/1989 | Anderl et al. | 235/380 |
| 4,985,920 | 1/1991 | Seki | 235/380 X |
| 5,038,025 | 8/1991 | Kodera | 235/492 |
| 5,161,256 | 11/1992 | Iijima | 235/380 |

FOREIGN PATENT DOCUMENTS

| | | | |
|---|---|---|---|
| 0479655 | 4/1992 | European Pat. Off. | |
| 2635891 | 3/1990 | France . | |
| 4009715 | 1/1992 | Japan | 235/380 |
| 92/13322 | 8/1992 | WIPO . | |

Primary Examiner—Donald Hajec
Assistant Examiner—Esther H. Chin
Attorney, Agent, or Firm—Ratner & Prestia

[57] ABSTRACT

An integrated circuit card includes a processing controller, a non-volatile memory having plural files in a hierarchical structure, with each file having an access conditions controller relating to the level number of said hierarchical structure, and a RAM having plural key information fields corresponding to the level numbers. Each access condition controller has an access key box designation table which indicates which keys should be verified and a vertical matching condition settings table which indicates which level keys should be collected for verification.

9 Claims, 18 Drawing Sheets

IC CARD WITH HIERARCHICAL FILE STRUCTURE

BACKGROUND OF THE INVENTION

1. Field of the Invention

The present invention relates to an integrated circuit card for controlling, using key referencing data, access to plural files contained therein.

2. Description of the Prior Art

Conventional integrated circuit cards ("IC cards") typically have a two level logical structure as shown in FIG. 23. The internal memory 200 of the IC card contains a single parent file 201 located in the first level, and plural child files 202, 203 located in the second level. The child files 202, 203 may be used by different applications. The parent file 201 is used by plural applications, and stores common data 204 such as the cardholder's name, address and telephone number, and a global key 205 that is not dependent upon the application. The child files 202, 203 store application-specific data 206, 208 and a local key 207, 209. The global key 205 and local keys 207, 209 (collectively the "keys" below) are used to control access to the parent 201 and child files 202, 203, and access to the common data 204 and application-specific data 206, 208 is only permitted after the required key has been correctly verified.

The conventional IC card file structure has only two levels, and access control is therefore also limited to these two levels. More specifically, if the global key 205 is correctly verified, the common data 204 as well as the application-specific data 206, 208 can be accessed, and if only a local key 207, 209 is verified, the specific data of the file protected by the verified local key can be accessed.

This file structure presents two problems. First, a file structure having three or more levels cannot be used because the access control method is limited to a two-level file structure. For example, if a grandchild file (not shown in the figures) belonging to one child file 202 is created, the local key 207 may be required to function as a global key for the dependent grandchild files, but this is not possible.

Second, anyone knowing the global key 205 (typically the card issuer) can access the application-specific data 206, 208 without knowing the local keys 207, 209. It is therefore not possible to create application-specific files that cannot be accessed by the card issuer, and file security cannot be assured.

SUMMARY OF THE INVENTION

Therefore, an object of the present invention is to resolve these problems by providing an IC card compatible with a hierarchical file structure and capable of maintaining the confidentiality of files from the card issuer.

To achieve this object, an IC card according to the present invention comprises a processing controller, non-volatile memory having plural files in a hierarchical structure and an access conditions controller related to the level number in the hierarchical structure, and volatile memory having plural key info‚nation fields corresponding to the level numbers.

By providing an access conditions controller for each file, and setting in the access conditions controller of the associated file the level number of the key information to be referenced when determining to permit or deny file access, access control compatible with a hierarchical file structure can be achieved. By setting the access conditions controller so that only the key information of that file can be referenced, files independent of the card issuer can be created.

BRIEF DESCRIPTION OF THE DRAWINGS

The present invention will become more fully understood from the detailed description given below and the accompanying diagrams wherein.

DESCRIPTION OF PREFERRED EMBODIMENTS

The first embodiment of an IC card with a hierarchical file structure according to the invention is described below with reference to the accompanying figures.

Figure 1:
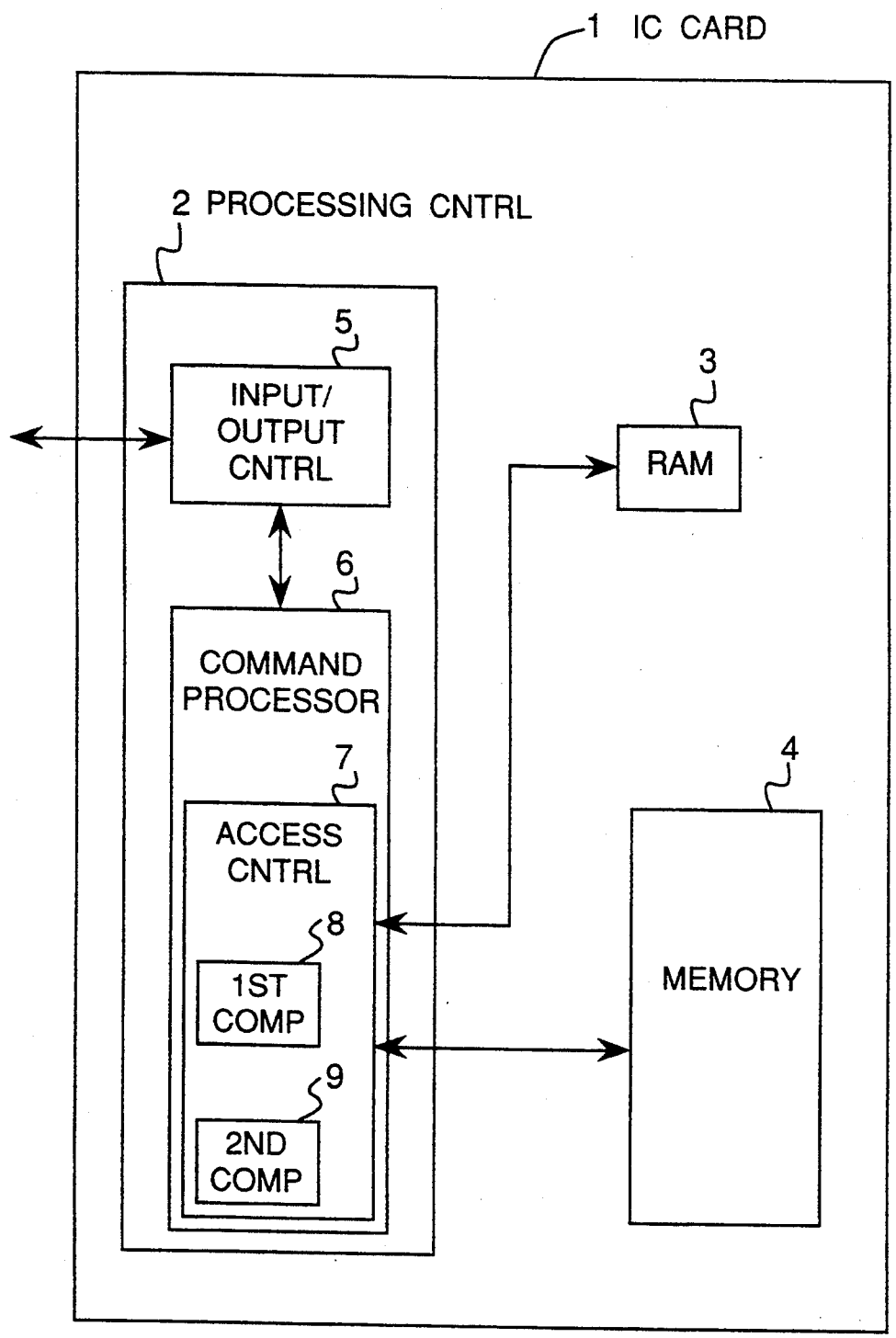
FIG. 1 is a block diagram of an IC card according to the first embodiment of the invention.

FIG. 1 is a block diagram of the first embodiment of this IC card 1 comprising a processing controller 2, RAM 3, and non-volatile memory 4. The processing controller 2 has an input/output control 5 and a command processor 6. The command processor 6 has an access control 7 which has a first comparator 8 for comparing the input key data and registered key data, and a second comparator 9 for comparing 8-bit data formed in RAM 3 and 8-bit data stored in memory 4, as will be described in detail later. The processing controller 2 may be formed in hardware using a CPU, ROM, input/output control, or other device, but is represented in FIG. 1 as a processing block achieved by means of a software program stored in a ROM device. A detail of this processing control 2 is described below.

Figure 2:
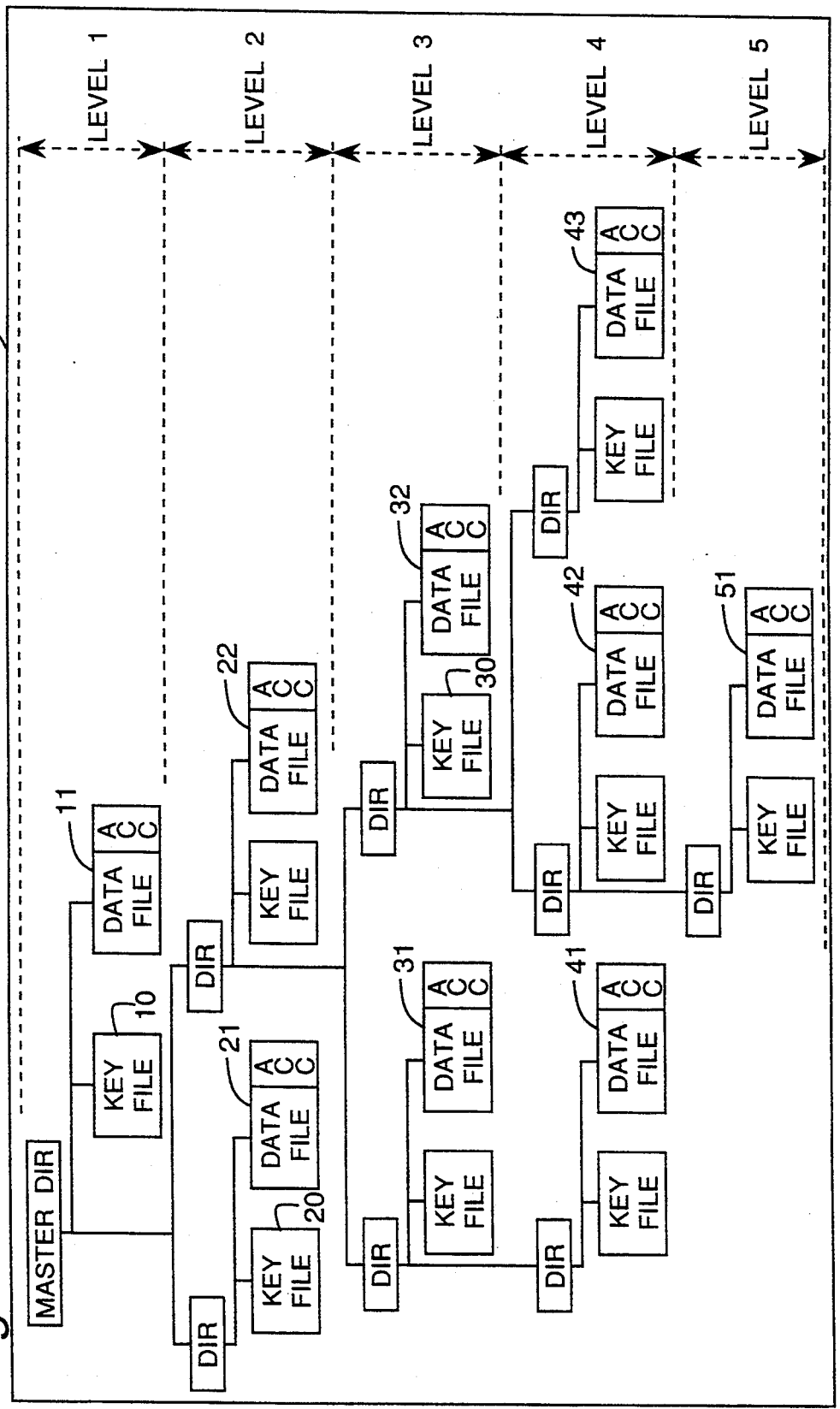
FIG. 2 is a block diagram of the non-volatile memory in an IC card according to the invention.

The non-volatile memory 4 stores plural files as shown in FIG. 2 in a logical file structure with five levels. Level 1 has a master directory, one key file 10 and one data file 11. Each of levels 2-5 has one or more directories, key files and data files. For example, level 2 has two directories, two key files and two data files 21 and 22.

Figure 3:
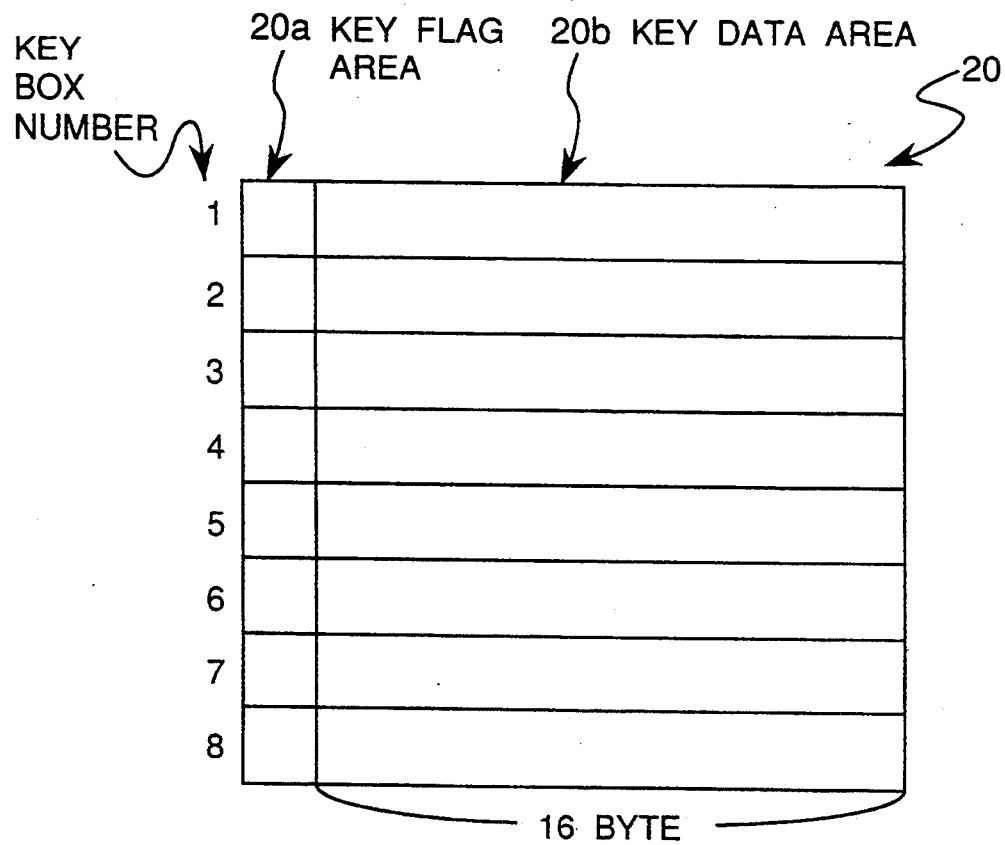
FIG. 3 is a block diagram of the key file structure in an IC card according to the invention.

As shown in FIG. 3, key file 20 for the level 2 has eight key boxes, and each key box has a key flag area 20a in which a key flag indicating whether or not key data is stored, and a key data area 20b in which key data are stored. Thus, the key file can store, at the maximum, eight different keys. Such keys may be registered by the holder (user) of the IC card, and/or by the distributer (bank, telephone company, etc.) of the IC card. The other key files have the same structure as the key file 20.

Figure 6:
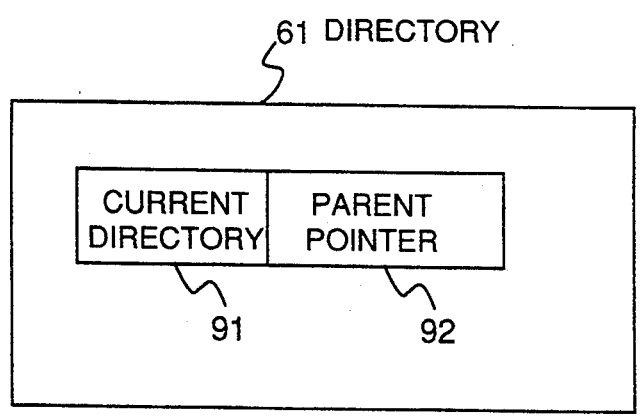
FIG. 6 is a block diagram of the directory in an IC card according to the invention.

Each data file and key file are managed by the directory 61, which has as shown in FIG. 6, a current level indicator 91 for indicating the current directory level and a parent pointer 92 for indicating the parent directory.

Figure 5:
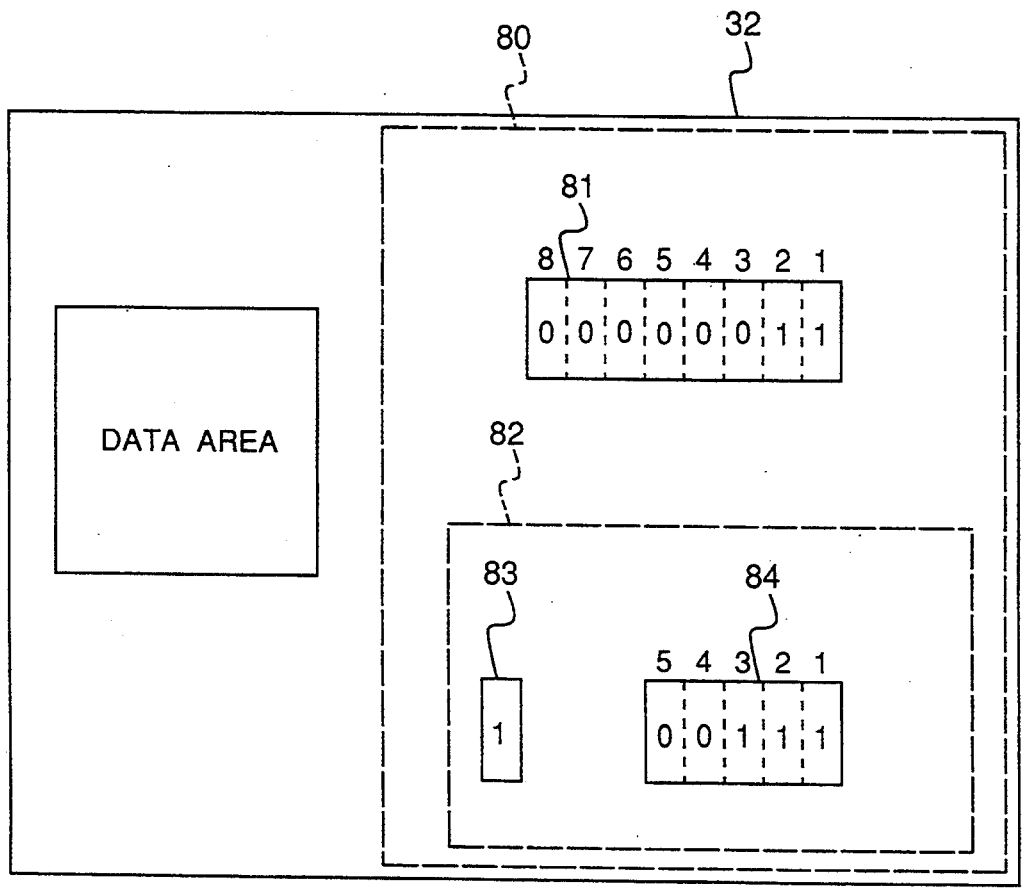
FIG. 5 is a block diagram of the data file structure in an IC card according to the invention.

As shown in FIG. 5, each data file, such as data file 32 at the third hierarchical level 3, comprises a data area for storing data. Each data file further has an access condition controller (ACC) 80 which comprises an access key box designation table 81 and a logic conditions area 82. The logic conditions area 82 further comprises a horizontal matching condition settings area 83 and a vertical matching condition settings table 84. The values set in the access conditions controller 80 differ for each data file.

The access key box designation table 81 is usually set by the card distributer and designates the key box numbers at which stored key data requires verification. In the example, it is indicated that the key data from key boxes 1 and/or 2 is (are) required to be verified. When both key data from key boxes 1 and 2 should be verified before allowing an access to the file, the horizontal matching condition settings area 83 is set to "1", but when at least one of the key data from key boxes 1 and 2 is sufficient, the horizontal matching condition settings area 83 is set to "0". In other words, horizontal matching condition settings area 83 sets logical AND condition or logical OR condition for the designated key box numbers.

The vertical matching condition settings table 84 is also usually set by the card distributer and sets the levels from which the key files are collected and can be used for checking. The data stored in vertical matching condition settings table 84 is used for controlling switches SW1-SW5 inserted in the lines connected to OR gate 70 in FIG. 4, as will be explained later. In the example, it is indicated that the key files from levels 1, 2 and 3 can be used for checking.

Figure 4:
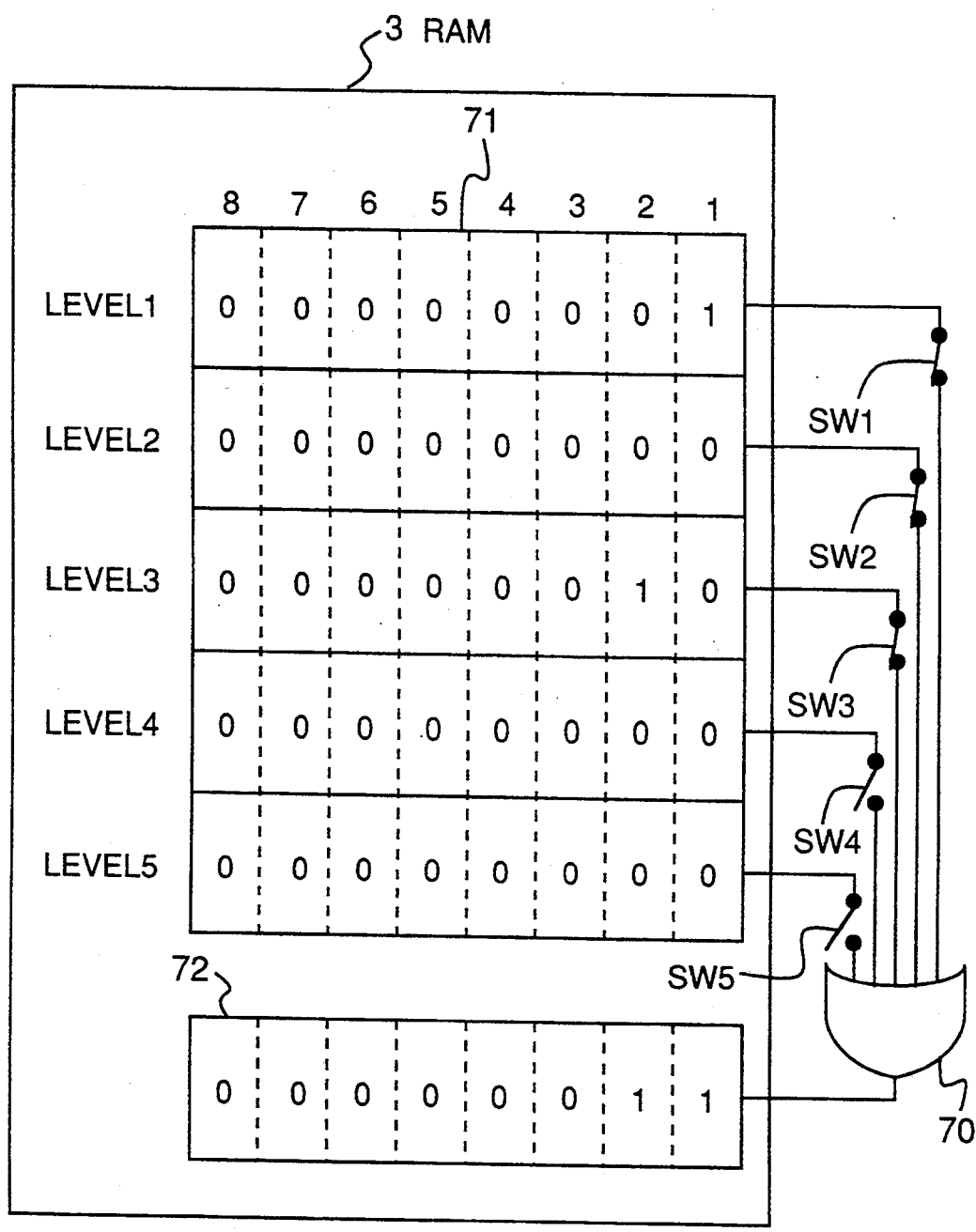
FIG. 4 is a diagram of the RAM in an IC card according to the invention.

The RAM 3 contains a key verification indication table 71, which is divided into five fields corresponding to the five levels of the hierarchical structure shown in FIG. 2, and each field comprises eight bits corresponding to eight key box numbers (where bit 1 is equivalent to key box number 1). For example, if the key data in key box 1 in level 1 is verified, indicator at right top corner in the key verification indication table 71 is set to "1", as shown in FIG. 4. Also, if the key data in key box 2 in level 3 is verified, the indicator at corresponding area in the key verification indication table 71 is set to "1". The indicator "1" in table 71 means that the corresponding key has been verified.

The RAM 3 further has a logical OR table 72 which takes logical OR along each column in table 71 by an OR gate 70 provided in association with RAM 3. According to the above example, left two bits are set "1" and the remaining bits are set "0". Switches SW1-SW5 are connected to five input lines connected to OR gate 70, respectively. Switches SW1-SW5 turn ON when corresponding bit in vertical matching condition settings table 84 is "1". Thus, according to the example shown in FIG. 5, switches SW1-SW3 are ON and switches SW4 and SW5 are OFF. Instead of OR gate, it is possible to use AND gate at 70.

In operation, it is assumed that data file 32, such as for bank cashing, has been selected for having an access.

First, the user inserts the IC card in a cash dispenser (not shown). Upon insertion of the IC card, the cash dispenser automatically sends an identification key data, together with data indicating key file 10 in level 1 and data indicating key box 1, through input/output 5 to command processor 6. Then the access control 7 reads, in accordance with the received data of level 1 and key box 1, the key data stored in the key box 1 of the key file 10 in level 1, and compares in the first comparator 8 the received identification key data with the key data stored in the key box 1 of the key file 10 in level 1. If these two keys match, the first comparator 8 generates "1" and is stored RAM 3, particularly in table 71 at area corresponding to key box 1 in level 1.

Thereafter, the user selects a "cashing" button on the cash dispenser, and inputs his own secret key data through a key board. By the depression of "cashing", the access control 7 is informed that the key data for matching is stored in key box 2 of key file 30 in level 3. Then, in the first comparator 8, the secret key data inputted by the user is compared with the key data stored in key box 2 of key file 30 in level 3. If these two keys match, the first comparator 8 again generates "1" which is stored in RAM 3, particularly in table 71 at area corresponding to key box 2 in level 3.

In the meantime, OR gate 70 takes logic OR in each column in table 71, i.e., among the same number key boxes, and stores the result in table 72. The 8-bit data stored in table 72 is applied to second comparator 9, which is an 8-bit comparator, for comparing 8-bit data stored in access key box designation table 81. When these two data meet the condition depending on the horizontal matching condition setting area 83, an access is granted to data file 32.

The process for accessing the data file 32 in level 3 will be further described in detail. As before, the file selection command is input to the input/output 5 and interpreted by the command processor 6. The command processor 6 searches for the file name specified by the external device (e.g, cash dispenser), and when successful transfers control to the access controller 7.

While the description so far has related to reading the data area, an access conditions controller is also provided for controlling write access. An access rights controller is also provided for each function, including key registration and updating.

Depending on the settings to the horizontal matching condition settings area 83 and the vertical matching condition settings table 84, access can be controlled in various ways. A typical example is described below. In this example there is a card issuer key (key number 1) and a cardholder personal identification number (PIN) key (key number 2) both stored at key file 10 (level 1), and a terminal key (key number 1) stored at key file 30 used by the application using the data file 32 on the terminal.

If verification of both the PIN and the terminal key is required to read the data area of file 32 in this application, the horizontal access condition is set to the logical product (set in the horizontal settings area) of the key number 1 key and the key number 2 key (set in access key box designation table 81) for the read function of the data area. To enable processing when the card is issued using the card issuer key in place of the terminal key, those parts of the vertical matching condition settings table 84 corresponding to levels 1 and 3 are set to "1." Conversely, to protect the data area against access even by the card issuer, only level 3 is set to "1" in the vertical matching condition settings table 84. Private files that cannot be accessed by the card issuer can thus be created in the IC card.

To enable the cardholder to update the PIN without assistance from the issuer, and to enable the issuer to provide assistance in the case the cardholder forgets the PIN, the horizontal access condition by horizontal matching condition settings area 83 is set to "0" for taking the logical OR of key numbers 1 and 2 for the PIN update function.

It is therefore possible to provide files that are independent of the issuer, and to control access in various ways. In addition, the number of file levels is not limited by this access control method.

It is to be noted that the structure of the vertical matching condition settings table 84 in this embodiment has been described as specifying the level number used in the logical OR calculations, but shall not be so limited, any method enabling identification of the method of calculating the logical OR can be used.

The method of retaining or destroying the information of the key verification indication table 71 (hereinafter referred to as key information) when a different file is selected is described below. It is preferable that keys on the higher levels can also function as global keys for lower level files. A typical example of this is the PIN. Users may often want to use the same PIN for plural applications. In this case, the one PIN is registered at the highest level of the file structure branch in which the plural files are stored rather than storing the PIN with each file. The single PIN can thus be used to access all files lower in the hierarchy. This global key concept is not limited to PIN applications, however, and can be applied to any desired key. Rather than enabling only the key registered in the highest level of the file structure to function as a global key, greater utility can be achieved by enabling any key registered at level n to function as a global key for files stored at all levels below level n in the hierarchy.

To enable this, the key information for files on a common branch in the file structure must be retained when two or more files are selected. Referring to FIG. 2, if the previously selected file is file 32 and a newly selected file is file 41, the key information up to level 2 is retained because the branches on which file 32 and file 41 are located start from the same level 2. Because the key file 30 for data file 32 (level 3) has no relationship to file 41, however, access to file 41 using the key file 30 must be prohibited for security. The key information for level 3 is therefore destroyed.

So that this process can be applied to various cases, the key verification indication table 71 shown in FIG. 4 comprises fields for each level as described above, and each file directory contains the information shown in FIG. 6 (in addition to file address and other information). Only that information required for this description is shown in FIG. 6.

Note that each directory retains the same information shown in FIG. 6. The current directory 91 is the number of the current level on which the file is located; for file 32 this is "3." The parent pointer 92 indicates (e.g., the position of the directory of the parent file) the parent file of this file. Thus, the directory of file 32 stores "the directory of file 22" as a parent pointer 92. Because there is no parent file for file 11, such information is written to the file 11 parent file pointer.

Figure 7:
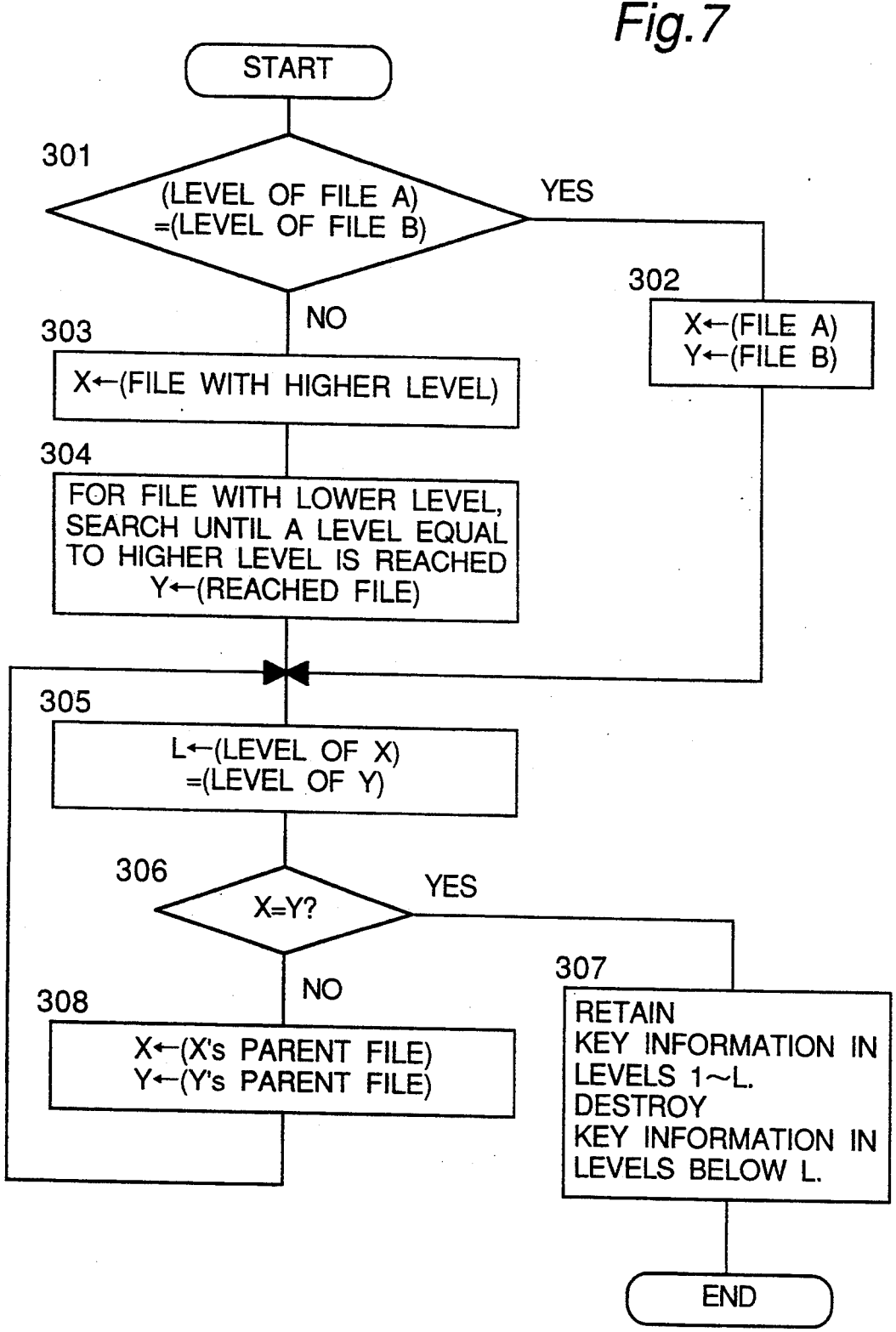
FIG. 7 is a flow chart of part of the access conditions control process in an IC card according to the invention.

The process executed using this information is described below with reference to FIG. 7. FIG. 7 is a flow chart for part of the access controller 7 shown in FIG. 1, specifically for processing the key information in the file selection command process. Note that in the following description the previously selected file is file A (data file 32), and the newly selected file is file B (data file 41).

(1) Steps 301–304

The level numbers of data files A (32) and B (42) are compared. If they are the same, X is registered with the file number of file A and Y with the file number of file B, and the process advances to (2) below.

If they are different, X is registered with the file number of a file with a higher level number (in this case, X←32). For the file with a lower level number, the file tree structure is searched upward until the level equal to the level number of X is reached, and the reached file number is registered in Y (in this case, Y←31). Then, the process advances to (2) below. (2) Steps 305–208

The common level number of the files registered in X and Y is detected and registered in L (in this case, L←3). At step 306, it is detected whether or not X=Y. In this case, since X=32 and Y=31, the process advances to Step 308 at which X and Y are registered with the parent file number of the current indicated file. Thus, at step 308, X=22 and Y=22 are set. Then, again at step 305, the common level number between the files registers in X and Y is detected and registered in L (in this case, L←2). In this manner, if the files registered in X and Y are not the same file, X and Y are reassigned to their parent files, and the loop is repeated until X=Y is obtained. At step 306, when X and Y are registered with the same file, i.e., X=Y, the process advances to step 307. In step 307, the key information from level 1 to level L is retained, and the key information for levels below L is destroyed to terminate the loop.

Loop (2) is thus repeated until X and Y are the same. Because there is only one root file in an IC card as shown in FIG. 2, the loop will always end with L≧1. The level numbers of each file shown in FIG. 6 are used to determine the level numbers of X and Y, and the parent pointer is used to determine the parent file of each file.

The adaptability of this procedure to various cases is described specifically below with reference to the file structure shown in FIG. 2.

If the previously selected file (file A) is file 32 (level 3) and the newly selected file (file B) is file 51 (level 5), X=file 32 because file 32 is on a higher level. By tracing back to level 3 to find the parent file of file 51, Y is set to file 32. Level L is thus 3. Because X=Y=file 32, the key information for levels 1-3 is retained, and the key information for levels 4 and 5 is abandoned. In this case, however, there is actually no change because the previously selected file (file 32) was at level 3.

However, if the previously selected file (file A) was file 51 (level 5) and the newly selected file (file B) was file 32 (level 3), the key information for levels 1-3 is retained and the key information fetched for levels 4 and 5 is destroyed.

In a different case in which the previously selected file (file A) is file 41 (level 4) and the newly selected file (file B) is file 51 (level 5), X=file 41, Y=file 42, and L=4. Because X and Y are different files, the parent files of each are located to redefine X and Y to file 31 and file 32, respectively. The level L is 3. Because X and Y still reference different files, the parent files are again searched, resulting in X=parent file 22 and Y=parent file 22. X and Y now match and the level L=2. The key information for level numbers 1 and 2 is therefore retained, and all key information for levels 3-5 is destroyed.

If the previously selected file and the newly selected file are the same file, file access can still be correctly processed by this procedure.

The description of this file structure has so far been limited to a file system in which only one file can be opened and in use at one time. When the file system has a limit of one open file at a time and it becomes necessary to access another file while working with the first file, the first file must be closed, the file to be accessed selected, and the required key verified before processing continues. Repeating this sequence of operations becomes increasingly inefficient when two files must be alternately accessed. Being able to simultaneously open and access more than one file at a time would therefore be extremely convenient and helpful.

Figure 8:
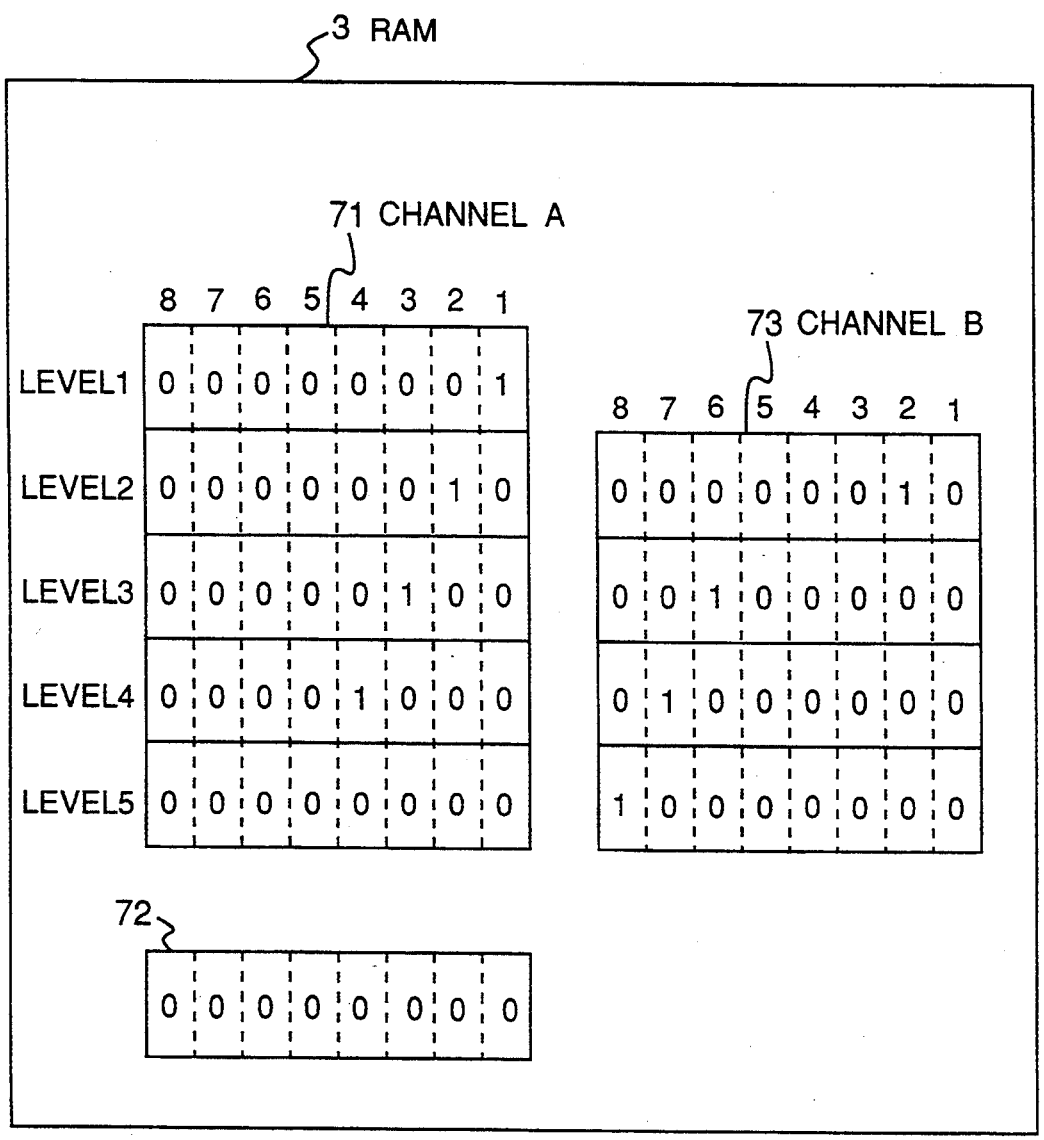
FIG. 8 is a diagram of the RAM in an IC card according to the invention.

To simplify the following description, the process whereby two files are simultaneously opened and accessed using two channel numbers (A, B) is described below. Which of the two open files is accessed is specified by the channel number in the command. To enable simultaneous opening of two files, separate key verification indication tables 71, 73 are provided for each channel in the RAM 3 as shown in FIG. 8. The key verification indication table 73 for channel B does not have a field for level 1 because level 1 is always common to both channels.

Whether the key information is held or destroyed depends on the level structure of the file and not on the channel. In other words, if the previously selected files on channels A and B are files P and Q, and the newly selected file on channel A is file R, the sum set of the key information common to the common branch of files P and R and the key information common to the common branch of files Q and R is retained.

More specifically, let us assume that file 41 in FIG. 2 is file P, file 51 is file Q, and file 43 is file R. Following the procedure described above, the key information to level 2 is retained based on the relationship between files 41 and 43. In addition, the key information to level 3 is also retained based on the relationship between files 51 and 43. Because the former key information is also contained within the latter key information set, the key information for channel A contains the key information for the latter, specifically for level 3 common to files 51 and 43.

Figure 9:
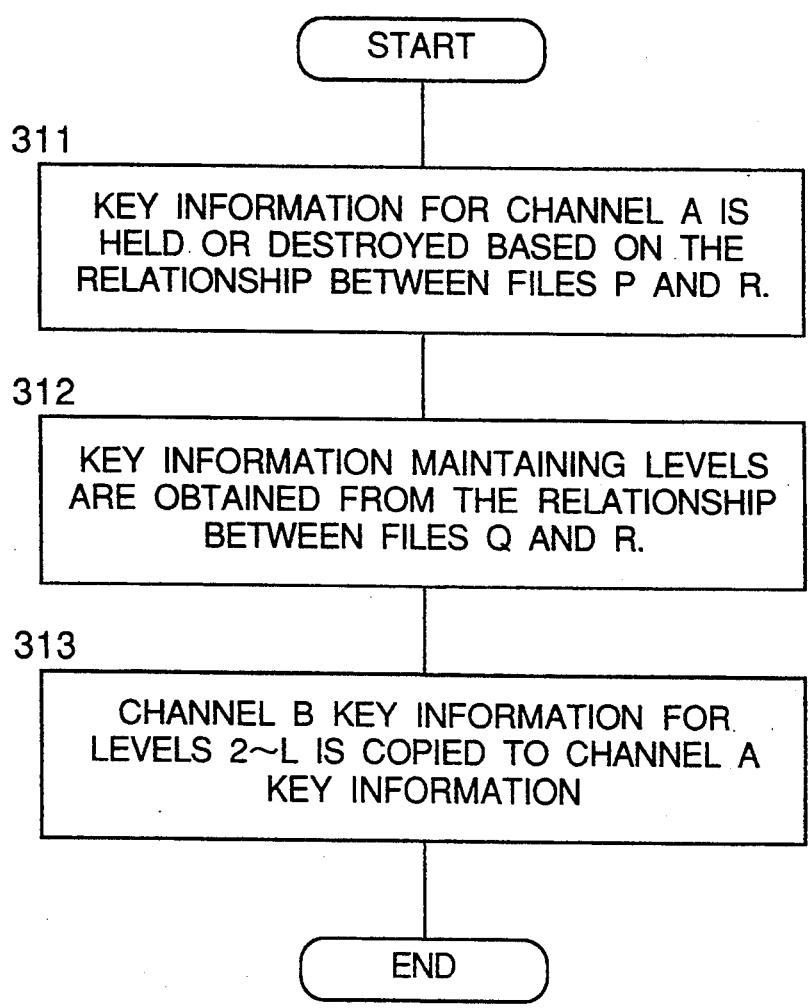
FIG. 9 is a flow chart of part of the access conditions control process in an IC card according to the invention.

The method whereby this process is executed for all cases is described below with reference to FIG. 9. FIG. 9 is a flow chart for part of the access controller 7 shown in FIG. 1, specifically for processing the channel A key information.

(1) Step 311

The key information for channel A is held or destroyed based on the relationship between files P and R. (The specific method conforms to the process described above for a file system enabling only one open file at a time.)

(2) Step 312

The level numbers 1-L for which the key information is to be retained are obtained from the relationship between files Q and R. (The specific method conforms to the process described above for a file system enabling only one open file at a time.)

(3) Step 313

The channel B key information for levels 2-L is copied to the channel A key information. (The channel B key information does not change because there is no change in the selected files.)

Figure 10:
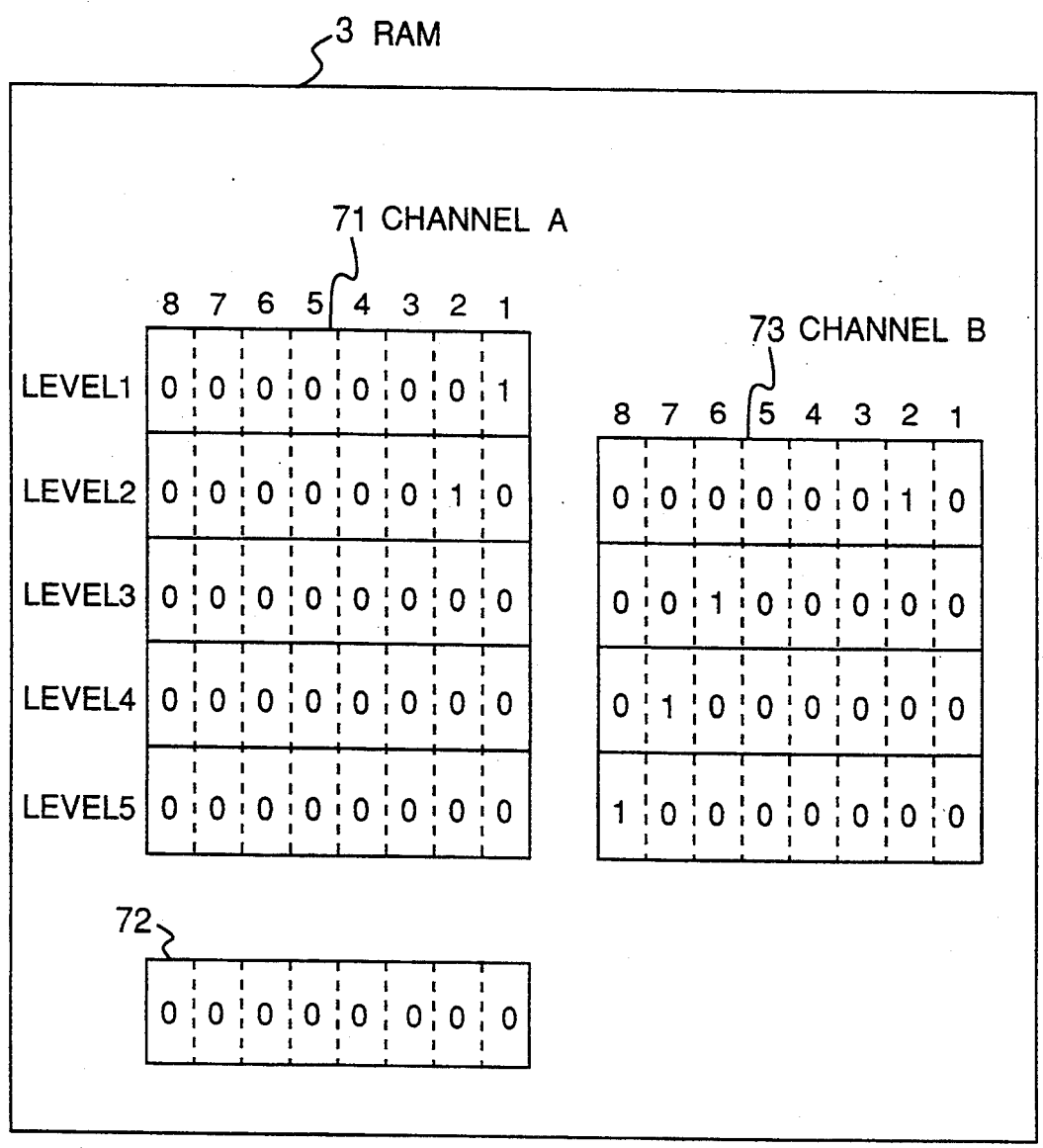
FIG. 10 is a diagram of the RAM in an IC card according to the invention.
Figure 11:
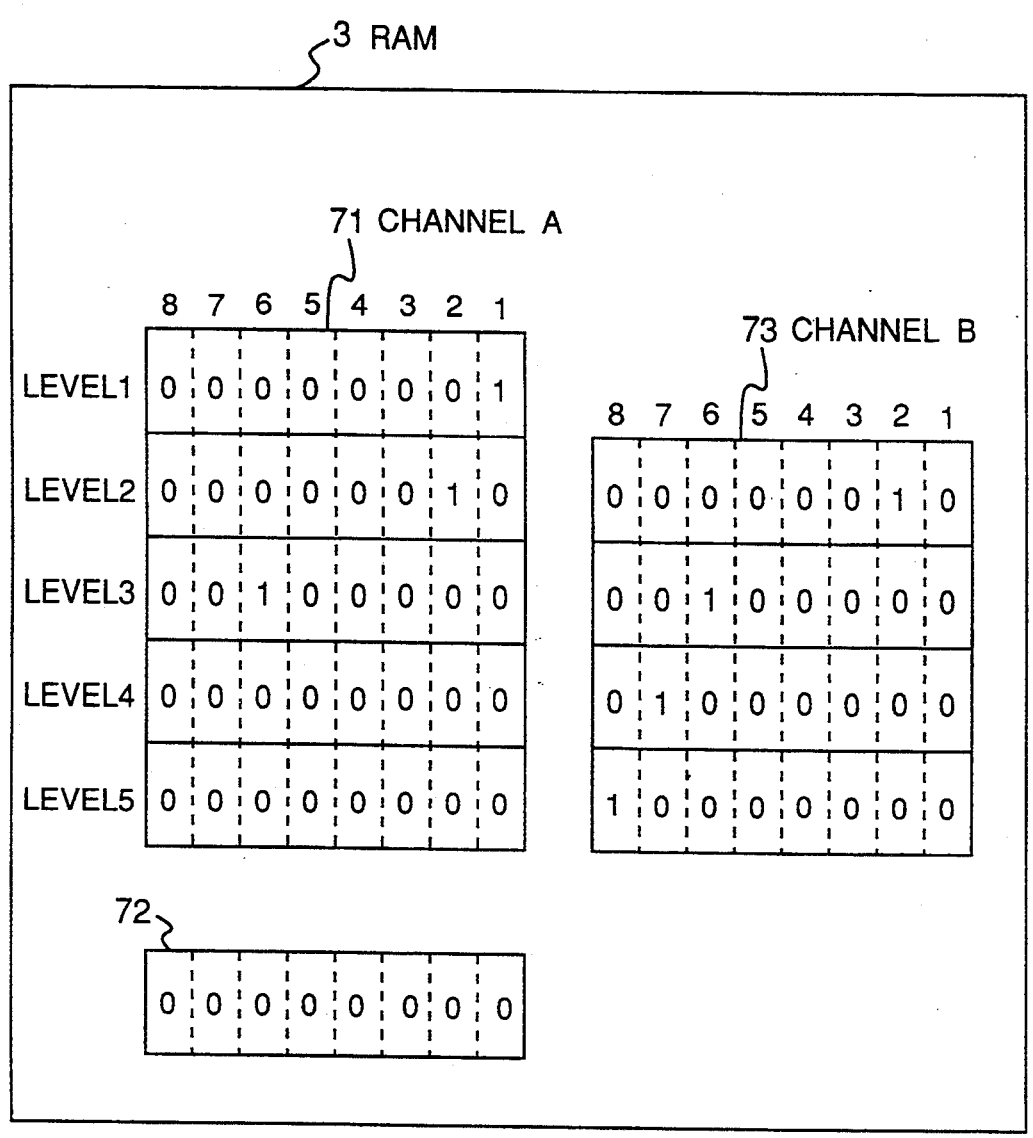
FIG. 11 is a diagram of the RAM in an IC card according to the invention.

This process is described specifically below referring to FIG. 2 and assuming that file 41 is file P, file 51 is Q, and file 43 is R. If the initialized state is as shown in FIG. 8, the channel A key information holds the data for levels 1 and 2 as shown in FIG. 10 as a result of step 311 above. Step 312 yields level L=3, and the channel B key information for levels 2 and 3 is copied to the channel A key information area in step 313, resulting in the values shown in FIG. 11.

Copying the key information for level 2 is redundant in step 313 above because level 2 is common to all three files 41, 51, and 43. The present method is still extremely effective, however, considering that there are any number of ways different files can be selected, and is applicable to all possible cases while remaining extremely simple. It is difficult to determine the branches common to plural files for each of the many different possible file selections in order to eliminate this redundancy, and the present method is thus more effective.

Another benefit of this method is expandability. For example, when the number of simultaneously usable files is increased to three or more (A, B, C, ...), it is sufficient to simply continue looping through step 313. The present method is therefore superior in terms of program size, processing speed, and expandability.

The method of deleting or expanding files managed by this hierarchical file directory is described next.

Figure 12:
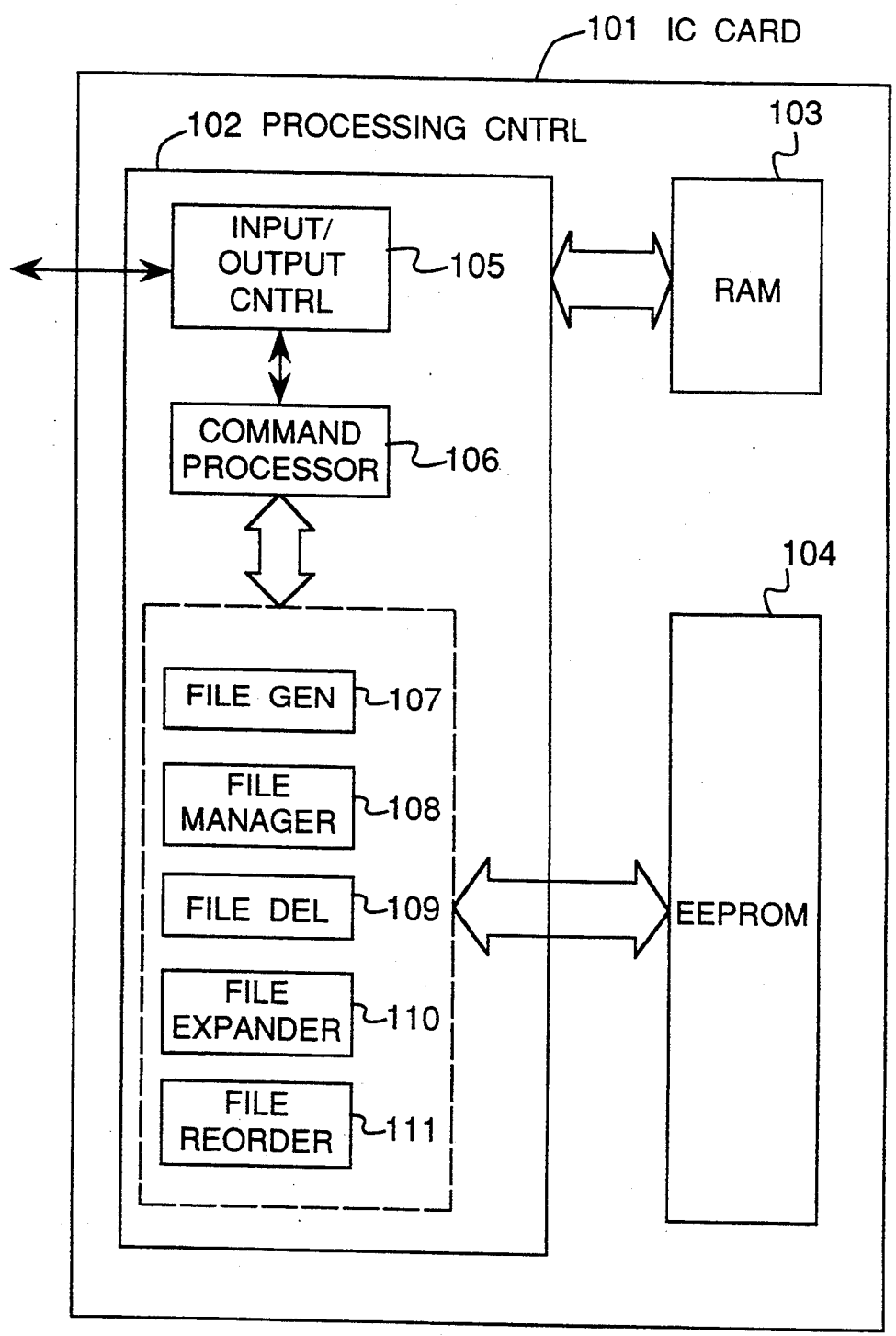
FIG. 12 is a block diagram of an IC card according to the second embodiment of the invention.

As shown in FIG. 12, an IC card 101 according to another embodiment of the invention comprises a process controller 102, which uses the RAM 103 as a process buffer, an input/output means 105 for exchanging data with an external device, a command processor 106, a file generator 107 for creating new files, a file manager 108, a file deleting means 109, a file expander 110 for increasing the capacity of a file selected by command, and a file reordering means 111 for compactly reordering the plural files stored in the EEPROM 104.

The command processor 106 analyzes and processes the commands received through the I/O means 105, and generates the response to the received commands. The command processor 106 also activates the file generator 107, file manager 108, file deleting means 109, file expander 110, and file reordering means 111.

Figure 13:
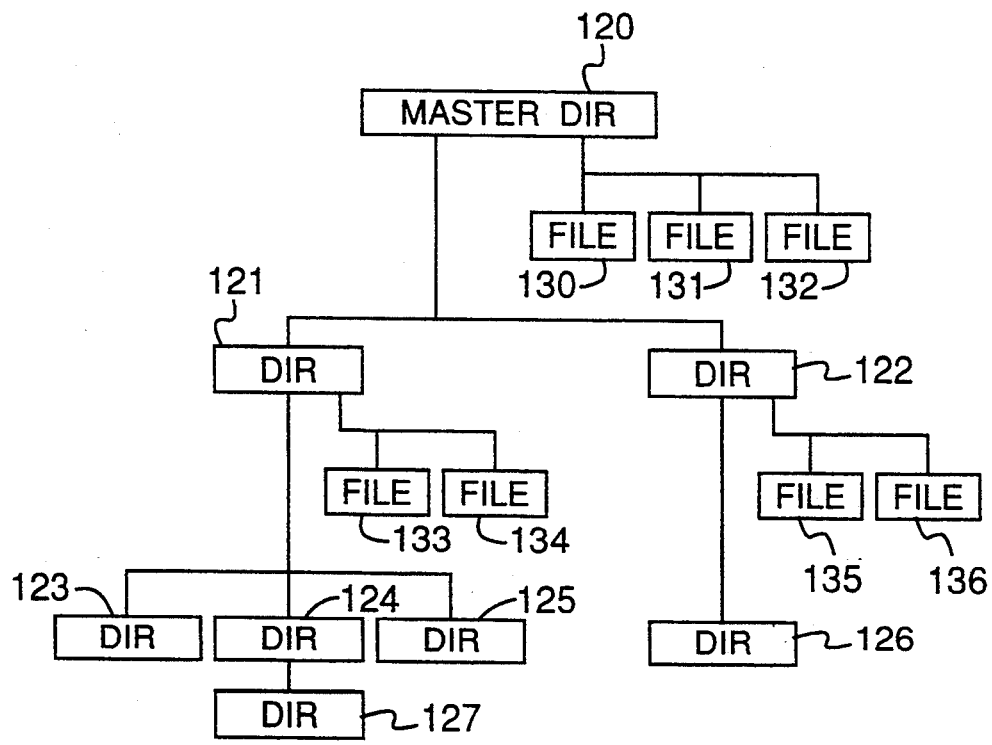
FIG. 13 is a block diagram of the directory in an IC card according to the second embodiment of the invention.

An example of the file directory in this IC card 101 is shown in FIG. 13. This file system comprises a master directory 120 and two dependent directories 121, 122. Directory 121 in turn has plural dependent directories 123, 124, 125, directory 122 has a dependent directory 126, and directory 124 has a dependent directory 127. As thus shown, the file structure of this IC card 101 comprises a single master directory 120 with plural dependent directories arrayed in a hierarchical structure, and each single directory can manage plural attached files (not shown in the figure) and directories. The following description refers to "parent" directories and the dependent directories of the parent directory as "child" directories.

Figure 14:
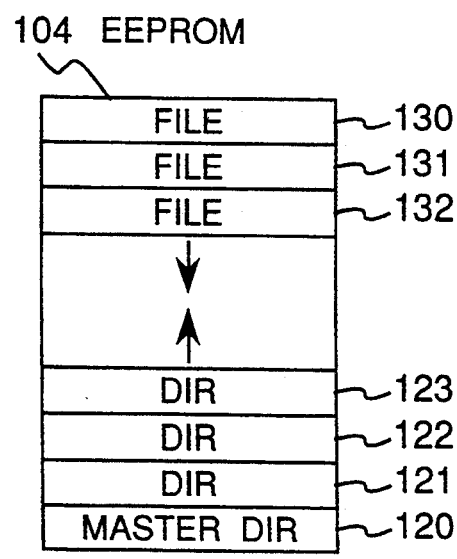
FIG. 14 is a diagram of the data written to memory in an IC card according to the invention.

The data structure of the file memory on IC card 101 is shown in FIG. 14 for this embodiment. Directories are stored from highest to lowest address, and files are stored from lowest to highest address in the EEPROM 104. The "user area" refers to the area storing the directories and files. Deleting a file from this structure creates unused areas in the EEPROM 104, and is inefficient. This makes it necessary to optimize the storage area by reordering the files and directories.

Figure 15:
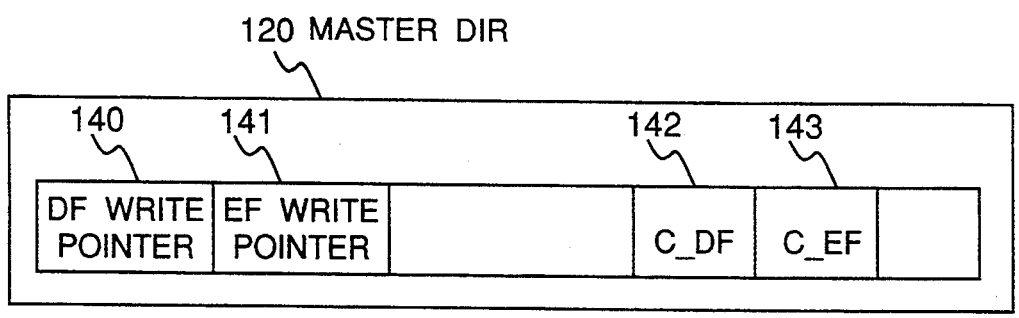
FIG. 15 is a diagram of the master directory data in an IC card according to the invention.

The data structure of the master directory, dependent directories, and files is described first. The structure of the master directory 120 of the IC card 101 is shown in FIG. 15. The DF write pointer 140 is the address of the last created directory (directory 123 in FIG. 14), the EF write pointer 141 is the address of the next file created (the next address after the last file address (file 132 in FIG. 14)), C_DF 142 is the address of the first created child directory (directory 121 in FIG. 14) managed by the master directory 120, and C_EF 143 is the address of the first created file (file 130 in FIG. 14) managed by the master directory 120. A value of 0000 is stored to C_DF 142 and C_EF 143 if the corresponding directory or file does not exist.

Figure 16:
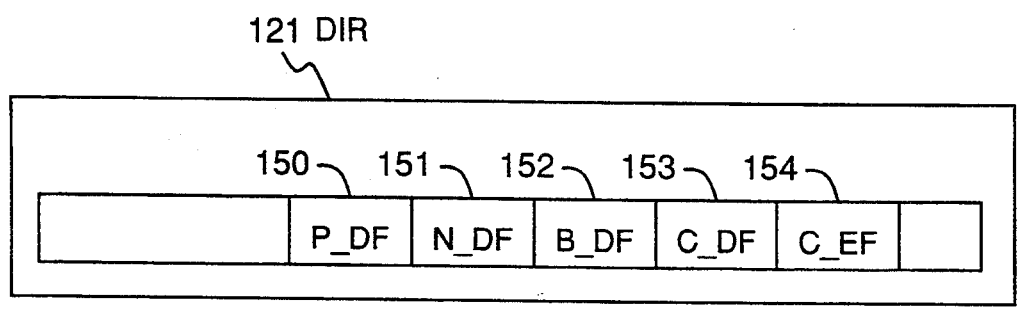
FIG. 16 is a diagram of the directory data in an IC card according to the invention.

The data structure of a dependent (child) directory 121 in this IC card 101 is shown in FIG. 16. P_DF 150 is the starting address of the parent directory of the directory (the master directory 120 in FIG. 13). N_DF 151 is the starting address of the directory created after directory 121 (i.e., directory 122 in FIG. 13) at the root of the parent directory managing that directory 121, B_DF 152 is the starting address of the directory created before directory 121 (i.e., does not exist in FIG. 14) at the root of the parent directory managing that directory 121, C_DF 153 is the address of the first child directory (directory 123 in FIGS. 13 and 14) created and managed by the directory 121, and C_EF 154 is the address of the first file (not shown) managed by the directory 121. A value of 0000 is stored to N_DF 151, B_DF 152, C_DF 153, and C_EF 154 if the corresponding directory or file does not exist. The other directories are similarly structured although the specific data differs.

Figure 17:
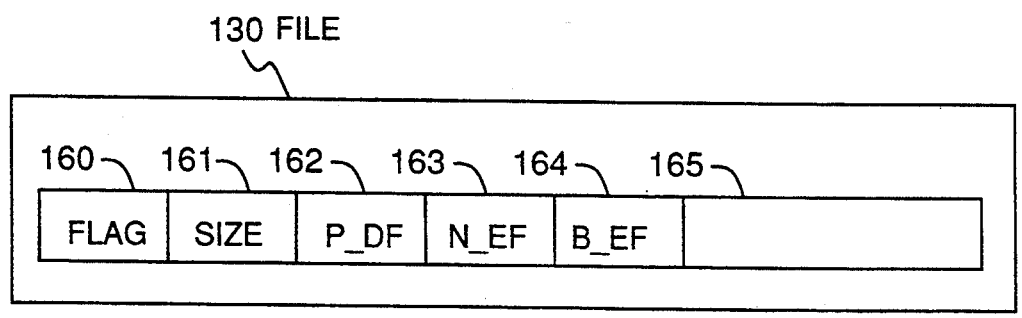
FIG. 17 is a diagram of the file data in an IC card according to the invention.

The data structure of a file 130 managed by this IC card 101 is shown in FIG. 17. Flag 160 indicates whether the file 130 is valid or invalid, size 161 expresses the capacity of the file 130. P_DF 162 is the starting address of the parent directory managing the file 130. N_EF 163 is the starting address of the file (not shown) created after file 130 at the root of the parent directory managing the file 130. B_EF 164 is the starting address of the file (not shown) created before file 130 at the root of the parent directory managing the file 130, and data is stored to the remaining data area 165. A value of 0000 is stored to N_EF 163 and B_EF 164 if the corresponding file does not exist. The other data files are similarly structured although the specific data naturally differs.

Figure 18:
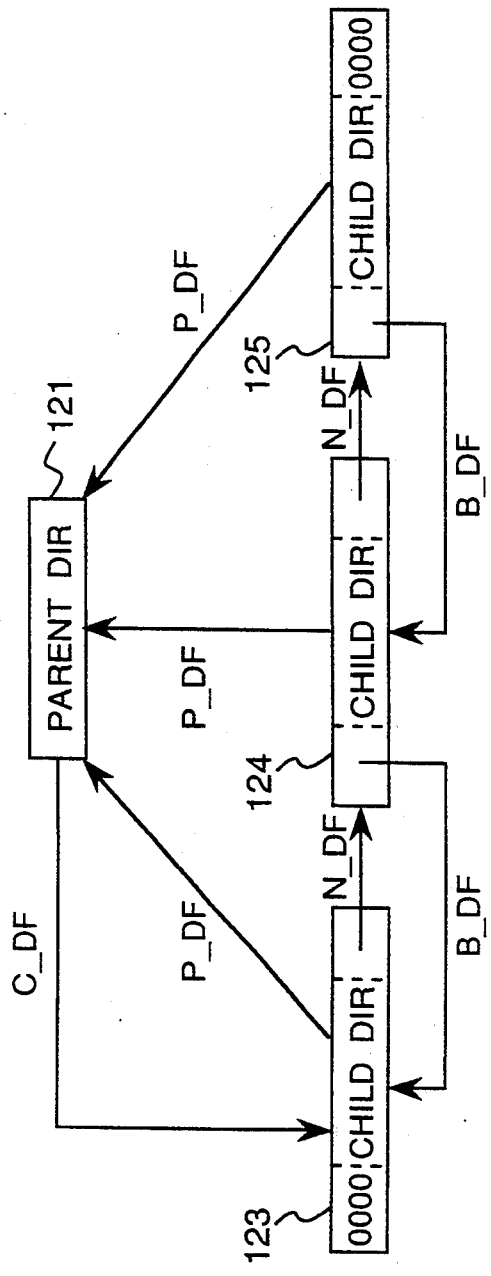
FIG. 18 is a block diagram used to describe the relationship between directories in an IC card according to the invention.

The relationship between the directories of this IC card 101 is described below with reference to FIG. 18 using directory 121 and its child directories 123, 124, and 125.

Each of the child directories 123, 124, and 125 stores the same pointer P_DF to the common parent directory 121 managing the child directories. The parent directory 121, however, stores a pointer C_DF to the first directory 123 created under the parent directory 121. Each of the child directories 123, 124, and 125 also stores pointers B_DF and N_DF defining the child directories created before and after the selected child directory. The B_DF value in the first child directory (directory 123 in this example), however, is 0000, and the N_DF value in the last child directory (directory 125 in this example) is 0000. The relationships between the parent directory and the child directories can be obtained from these pointers. It is also possible that the parent directory is the master directory 120.

Figure 19:
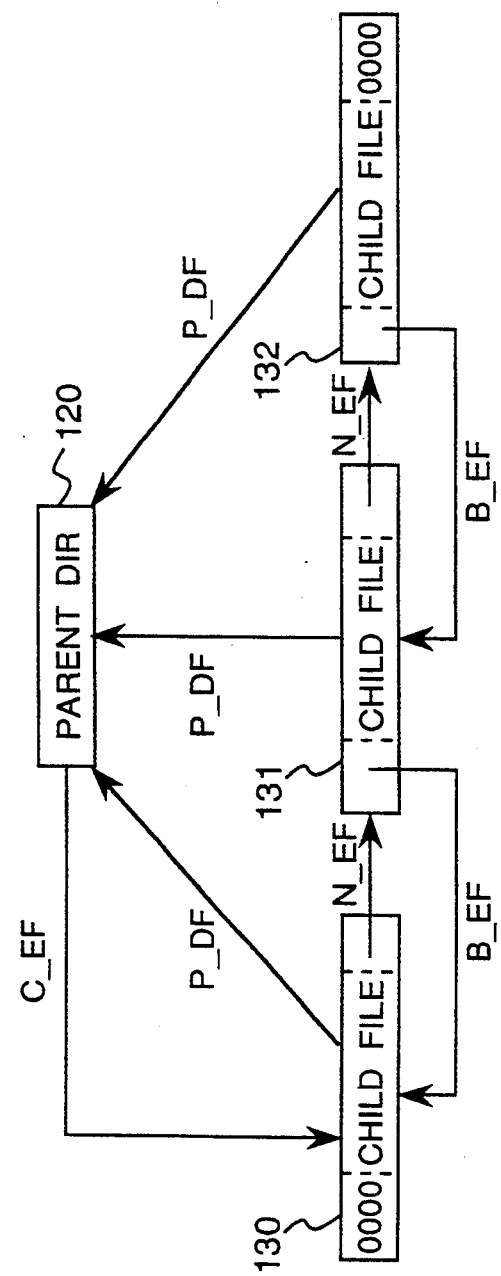
FIG. 19 is a block diagram used to describe the relationship between files in an IC card according to the invention.

The relationships between the files 130, 131, 132 managed by the master directory 120 in this IC card 101 are described below with reference to FIG. 19. Each of the files 130, 131, 132 stores a pointer P_DF to the common parent directory 120 managing these files. The parent directory 120 stores a pointer C_EF to the first file created (file 130), and each of the files 130, 131, 132 stores pointers B_EF and N_EF defining the files created before and after the selected file. The B_DF value in the first file (file 130 in this example), however, is 0000, and the N_DF value in the last directory (file 132 in this example) is 0000. The relationships between the files managed by the common directory can be obtained from these pointers. It is also possible that the parent directory is not the master directory 120.

Management of directories and files is made easier in an IC card 101 according to this embodiment by means of pointers to the hierarchically arranged directories and files. The processes for deleting, reordering, and expanding files in this IC card 101 are described next.

Figure 20:
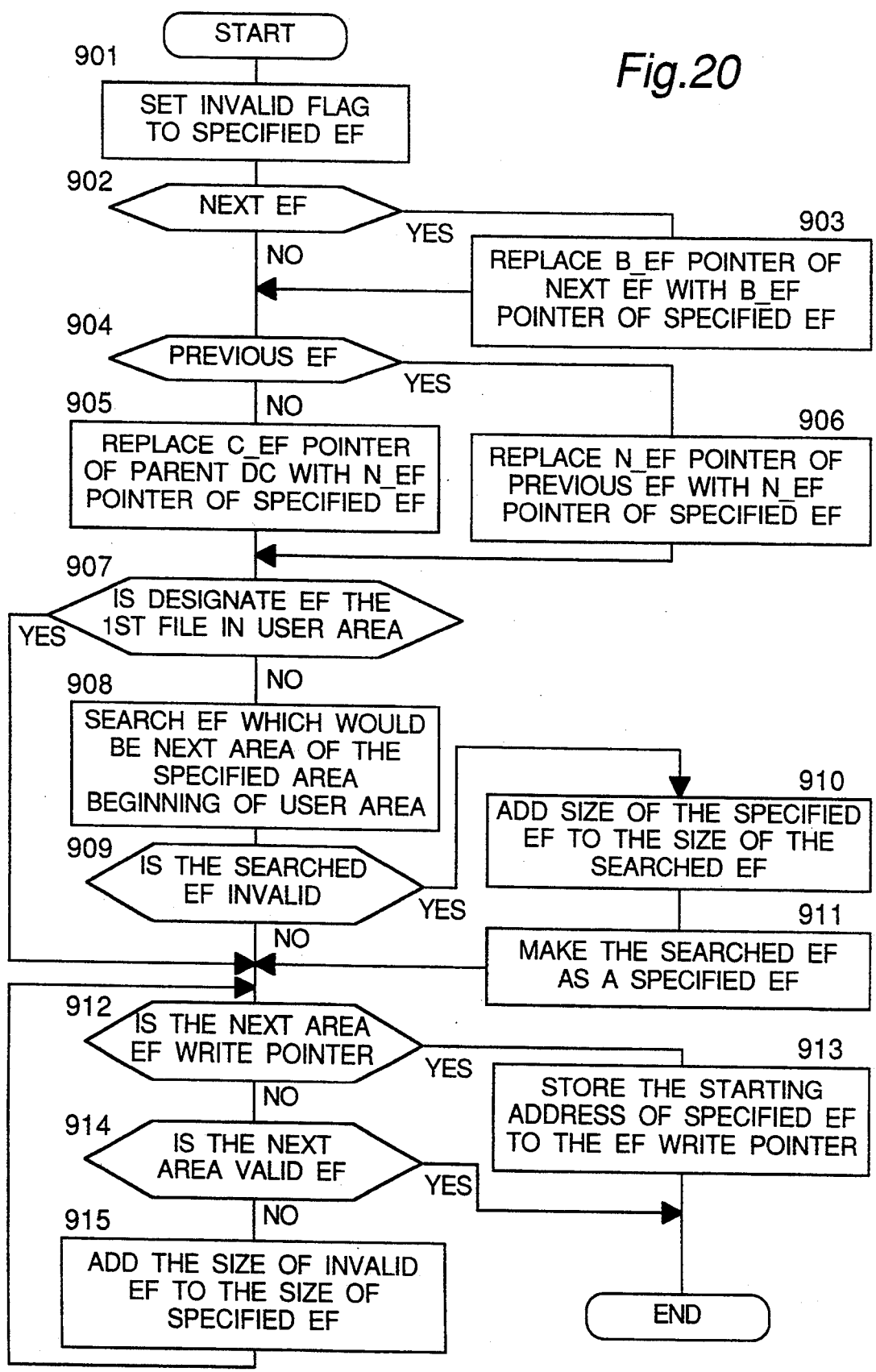
FIG. 20 is a flow chart of the file deletion process in an IC card according to the invention.

The file deletion process is described with reference to the flow chart in FIG. 20.

The file to be deleted ("EF" is used for a "file" in the figures and below) is specified by command. The specified file EF is designated invalid to other operations using a flag 160. Deleting the specified file EF, however, also makes it necessary to update the pointers in all files and directories (DF in the figures and below) referring to the pointer of the file to be deleted.

The first step in this process is to determine whether the value of the pointer N_EF to the file created after the deletion file EF is 0000; if it is, no file was created after EF, and the procedure advances to the next step. If N_EF does not equal 0000, there is a file after the file EF to be deleted from the hierarchy. The value of the B_EF pointer to the file preceding the file EF specified for deletion is therefore substituted for the value of the B_EF pointer in the following file. The value of the B_EF pointer in the deletion file EF can be 0000 at this time (i.e., the file being deleted is the first file in the directory).

The next step is to determine whether the value of the pointer B_EF to the file created before the deletion file EF is 0000; if it is, no file proceeds the file EF to be deleted in the directory, and the specified file EF is the first file in the directory. It is therefore necessary to update the C_EF pointer of the parent directory to the N_EF pointer value of the selected file, i.e., to the file following the first file in the directory. If the B_EF pointer value is not 0000, there is a file higher in the hierarchy than the deletion file EF, and the N_EF pointer in that higher file must be updated to the N_EF pointer of the selected file EF, which points to the file following the selected file EF in the hierarchy.

After the file is deleted, it is necessary to update the information to eliminate resulting open addresses. If the physical address of the selected file EF is not the first address in the user area of the memory, the file preceding the selected file EF must be located in the user area. If the located file is an invalid file, i.e., there are two consecutive invalidated files in memory, it is necessary to combine the two files into one. The size of the selected file EF is therefore added to the size of the located file, and the combined area of the selected and located files is redefined as the selected file EF.

If the physical address of the area following the selected file EF in memory is the write pointer, the last file EF in memory has been deleted. The file write pointer is updated to the starting address of the selected file EF, and the process ends. If the next memory area is a valid file, the process also ends. If the next memory area is an invalid file, i.e., there are consecutive invalid files in memory, the size of the selected file EF is added to the size of the located file, and the area following the selected file EF is again checked.

Figure 21:
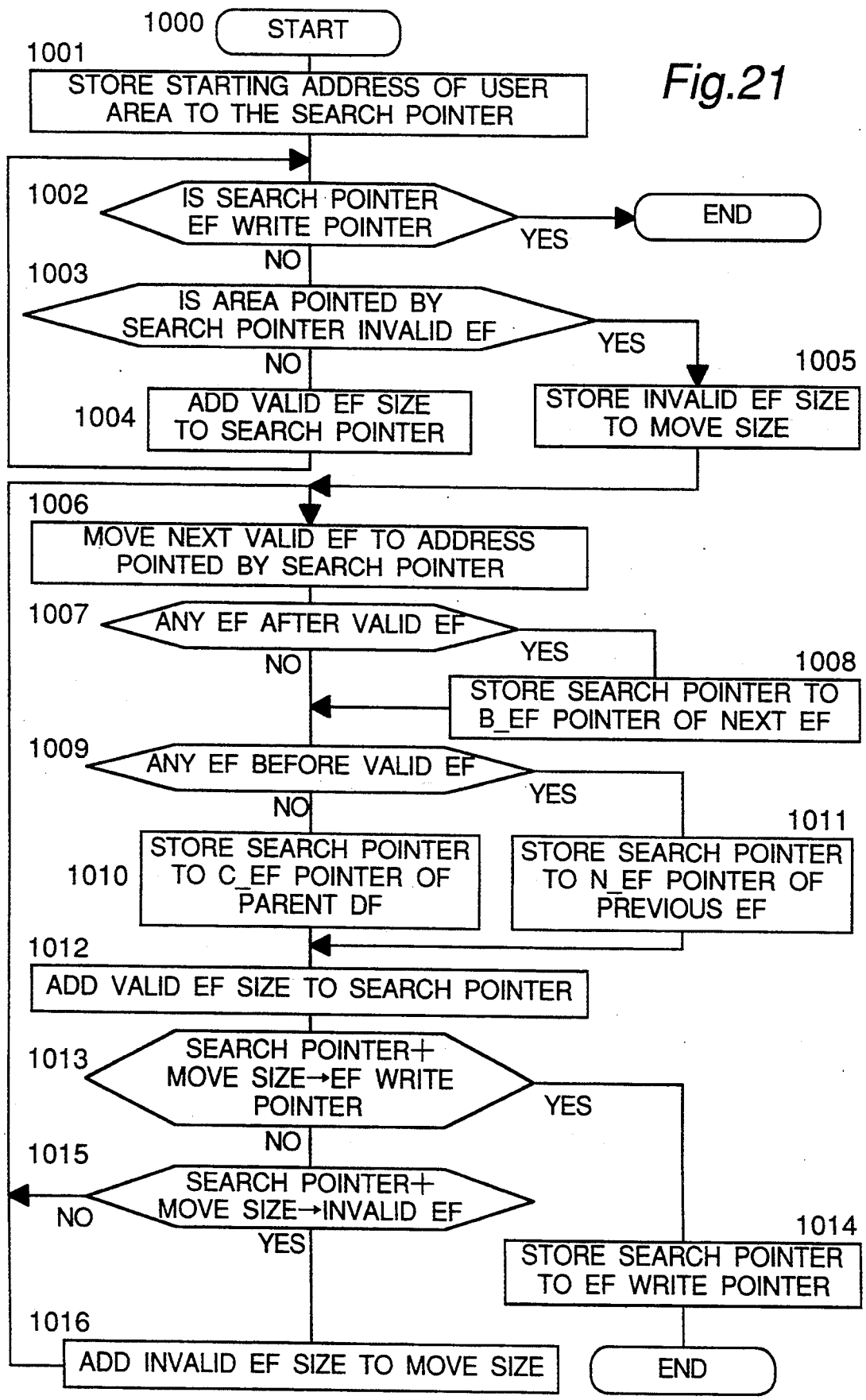
FIG. 21 is a flow chart of the file reordering process in an IC card according to the invention.

The file reordering process is described with reference to the flow chart in FIG. 21.

The starting address of the user area of the memory is stored to the search pointer (in the processing buffer). The file structure is then searched until the area indicated by the search pointer is an invalid file EF. If the search pointer is the file write pointer, processing ends because there are no invalid files in memory. If the search pointer is to a valid file, the size of the valid file is added to the search pointer to update the search pointer. If the search pointer is to an invalid file, the size of the invalid file is added to the move size (in the processing buffer), and the following process is executed.

To store the valid files to the smallest possible contiguous memory area, the valid files following the located invalid file are moved by the move size to the address indicated by the search pointer. If there are any files or directories with a pointer to the moved files, those pointers must also be updated.

If the N_EF pointer to the file following the selected file EF is 0000, there is no file after the selected file EF, and the process advances. If the N_EF pointer is not 0000, there is a file following the selected file EF, and the B_EF pointer of the file pointed to by the N_EF pointer is assigned to the search pointer. There does not have to be a file preceding the selected file EF at this time (B_EF=0000).

The value of the B_EF pointer of the selected file EF is then evaluated. If B_EF=0000, there is no preceding file and the selected file EF is the first file in the managing directory. The search pointer is therefore substituted for the C_EF pointer to the first file created in the managing directory. If B_EF≠0000, there is a preceding file and the N_EF pointer of that preceding file is therefore assigned to the search pointer.

The search pointer is updated by adding the size of the moved valid files to the search pointer. If the area at the address indicated by the search pointer plus the move size is the file write pointer, the search pointer is substituted for the write pointer and the process ends. If the next area is a valid file, the same process is repeated starting from the file movement process. If the next area is an invalid file, the move size is increased by the size of the invalid file, and the same process is repeated starting from the file movement process.

Figure 22:
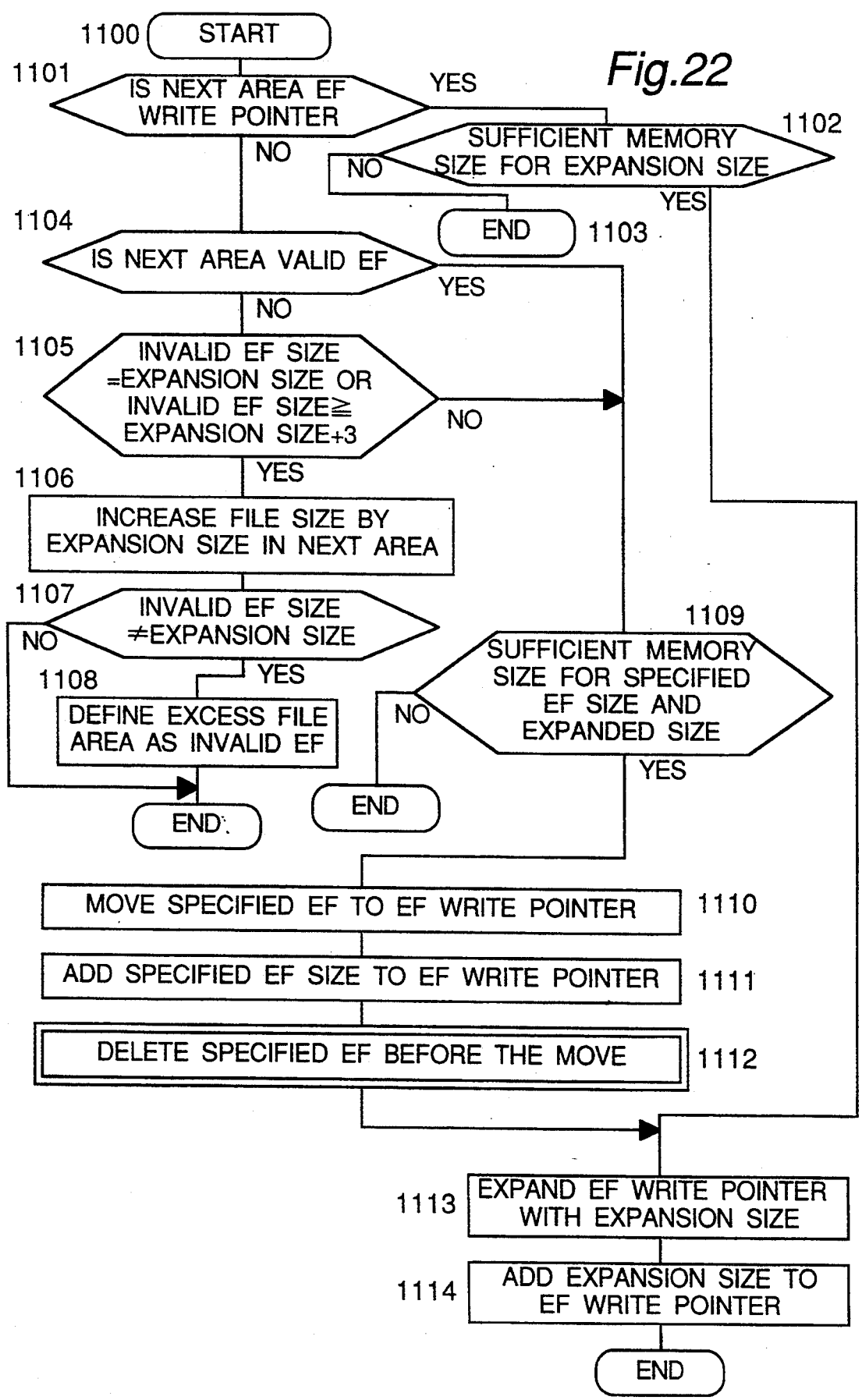
FIG. 22 is a flow chart of the file expansion process in an IC card according to the invention.
Figure 23:
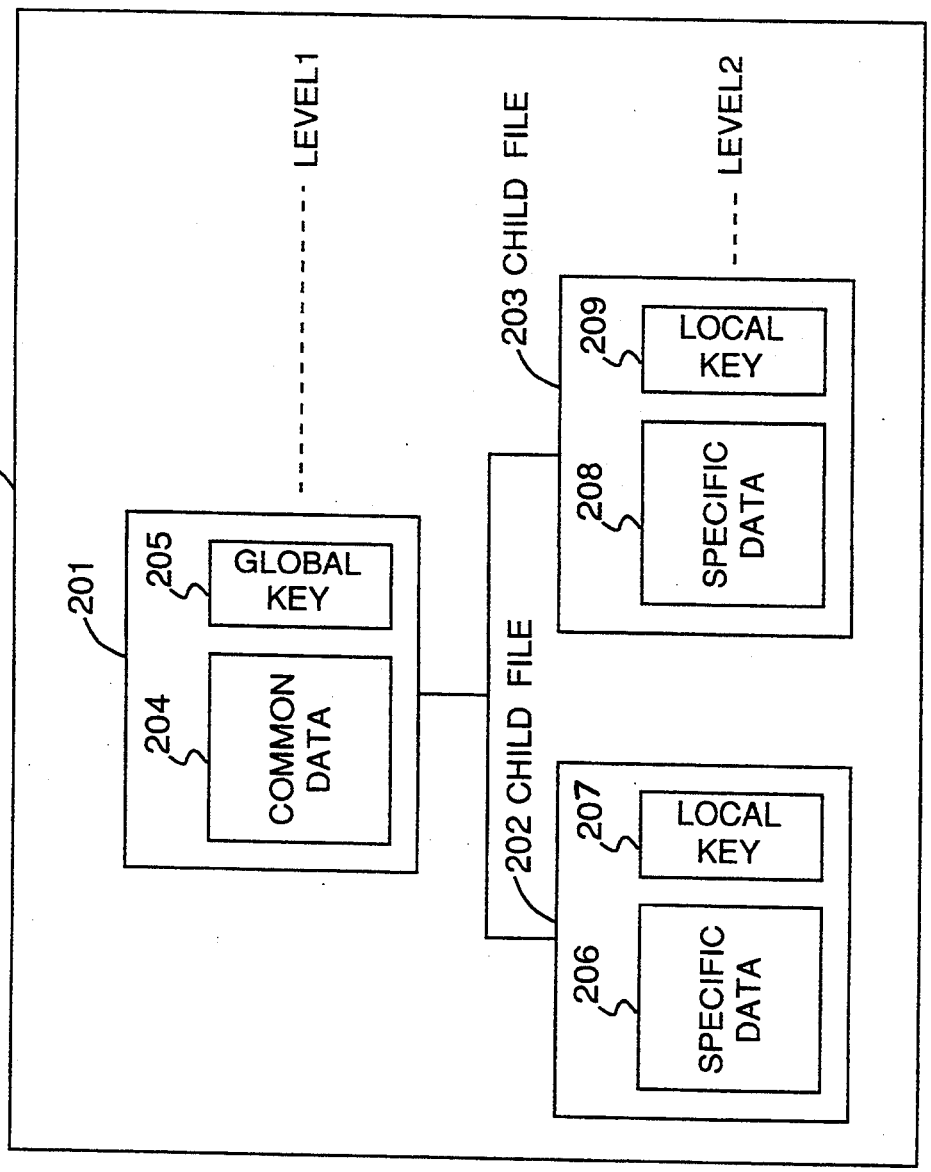
FIG. 23 is a block diagram of the memory in a prior art IC card.

If the size of a single file is increased in this file structure using a file capacity expansion means as described below in order to more effectively use a single file, unused areas will occur in memory, again making it necessary to reorder the files. This file size expansion process is described with reference to the flow chart in FIG. 22 below.

The file to be expanded and the expansion size are specified by commands. If the physical address in memory after the end address of the specified file is the file write pointer, it is determined whether there is sufficient open memory from the write pointer to increase the file size by the expansion size. If there is not, the process ends. If there is, the file size is increased and the write pointer is updated. Specifically, the size of the specified file EF is updated to the original size plus the expansion size, and the write pointer is also updated to the write pointer plus the expansion size.

If the physical address in memory after the end address of the specified file is a valid file, it is determined whether the open memory area following the write pointer is larger than the selected file size plus the expansion size. If there is not, the process ends. If there is, the specified file is copied to the address indicated by the write pointer, and the write pointer is updated by adding the specified file size to the original write pointer. The copied source file is designated an invalid file using the file deletion process described above. The expansion size is then added to the selected file size and the file size is updated, and the expansion size is added to the write pointer to update the write pointer.

If the next physical address after the end address of the specified file is an invalid file, it is determined whether the invalid file size is equal to the expansion size or is at least 3 bytes (the size of management information of invalidated file) larger. If it is, the specified file is expanded by the size of the invalid file, i.e., the selected file size is updated by adding the size of the deleted file. If the size of the invalid file is larger than the expansion size by three bytes or more, the excess file area is defined as an invalid file. If the size of the invalid file is less than the expansion size, the process applied when a valid file follows the physical end address of the specified file is executed as described above.

Multipurpose use of an IC card is enabled by the file deletion and file size expansion processes described above in a hierarchical file structure. Unused memory resulting from file deletion or expansion can be eliminated and the memory can be more effectively used because files can also be reordered in memory.

By thus providing an access conditions controller relating to the level numbers of the file structure in non-volatile memory, and providing plural key information fields corresponding to the level numbers in volatile memory, an IC card compatible with a hierarchical file structure and capable of maintaining files secure from access by the card issuer can be provided.

Hierarchical key information can also be efficiently retained or erased from memory as required by including in each file data for determining the level number of the file and the parent file of the file.

An access control method of superior program size, processing speed, and expandability can be provided for a file structure enabling plural files to be simultaneously open by providing a means for updating the key information of the first file based on the relative locations in the hierarchical file structure of the first selected file and a second file newly selected on the same channel, copying part of the key information for each of the selected files other than the first file to the key information of the first file based on the relationship between these files and the second file, and resetting the key information of the second file.

By thus managing the file directory hierarchically, an IC card according to the present invention can be used for many purposes, the directories and files can be easily accessed using plural pointers, file deletion, expansion, and optimization are possible, and the memory available to the IC card can be effectively used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An integrated circuit card comprising:
    a processing controller,
    non-volatile memory means having plural files in a hierarchical structure, and each file having an access conditions controller relating to a level number of said hierarchical structure; and
    volatile memory means having plural key data fields corresponding to the level numbers.

2. An integrated circuit card according to claim 1 wherein the access conditions controller has information limiting the level number.

3. An integrated circuit card according to claim 1 further comprising file optimizing means for eliminating open areas containing no information in the memory, and compactly reordering the plural valid files in memory.

4. An integrated circuit card according to claim 3, further comprising means for specifying by command whether to compactly reorder plural valid files.

5. An integrated circuit card comprising:
    a processing controller,
    non-volatile memory means having plural files in a hierarchical structure where each file contains level number information for identifying at least the level number of the file, and parent file information for identifying the parent file of the file in the hierarchical structure,
    volatile memory means having plural key information fields corresponding to the level numbers, and comprising
    means for obtaining the lowest level number L of common branches in the hierarchical structure of a first selected file and a newly selected second file using the level number information and parent file information; and
    means for holding the information of the field corresponding to level 1 to level L in the key information field, and abandoning all other field information.

6. An integrated circuit card comprising:
    a processing controller,
    non-volatile memory means having plural files in a hierarchical structure, and
    volatile memory means having n key information areas corresponding to selected n (where $n \geq 2$) files,
    means for changing the contents of the key information area relating to a first file based on the relative positions in the hierarchical structure of the first of the selected n files and a newly selected second file, and
    means for copying part or all of the contents of the key information area of each file to the first key information area based on the relative positions in the hierarchical structure of the second file to each of the $n-1$ files other than the first file in the selection of n files.

7. An integrated circuit card comprising
    a buffer,
    memory means for storing data,
    a processing controller which uses the buffer for processing and comprises:
    input/output means for exchanging data with an external device,
    command processor means for analyzing and processing commands received through the input/output means, and generating the response to a received command,
    file manager means activated by the command processor means for accessing data and data collections in memory, and
    file generator means activated by the command processor for creating files,
    said file manager means hierarchically managing files and file management directory by means of addresses identifying single files and an address identifying a directory of plural files.

8. An integrated circuit card according to claim 7 further comprising file deletion means for deleting a file specified by command.

9. An integrated circuit card according to claim 7 further comprising file expansion means for expanding the capacity of a file specified by command.

* * * * *